United States Patent [19]

Sakaibara et al.

[11] Patent Number: 5,786,822
[45] Date of Patent: Jul. 28, 1998

US005786822A

[54] METHOD AND APPARATUS FOR MAPPING TEXTURE ON AN OBJECT DISPLAYED AT A VARYING VIEW ANGLE FROM AN OBSERVER

[75] Inventors: Toru Sakaibara, Kawasaki; Toshiharu Kawasaki, Yokohama; Toshiyuki Kuwana, Hitachi, all of Japan

[73] Assignee: Hitachi, Ltd., Tokyo, Japan

[21] Appl. No.: 874,954

[22] Filed: Jun. 13, 1997

Related U.S. Application Data

[63] Continuation of Ser. No. 371,367, Jan. 11, 1995, abandoned.

[30] Foreign Application Priority Data

Jan. 26, 1994 [JP] Japan ................... 6-007017

[51] Int. Cl.$^6$ .............................. G06T 11/40
[52] U.S. Cl. ..................... 345/430; 345/426; 463/30; 463/33
[58] Field of Search .................. 345/426, 427, 345/428, 429, 430, 418; 434/38, 63; 463/30–34

[56] References Cited

U.S. PATENT DOCUMENTS

| | | | |
|---|---|---|---|
| 4,807,158 | 2/1989 | Blanton et al. ................ | 395/125 |
| 4,935,879 | 6/1990 | Ueda ............................ | 395/130 |
| 5,046,026 | 9/1991 | Tolomei ........................ | 395/152 |
| 5,097,427 | 3/1992 | Lathrop et al. ................ | 395/130 |
| 5,222,205 | 6/1993 | Larson et al. ................. | 395/130 |
| 5,224,208 | 6/1993 | Miller, Jr. et al. ........... | 395/125 |
| 5,230,039 | 7/1993 | Grossman et al. ............ | 395/130 |
| 5,325,480 | 6/1994 | Rice ............................. | 395/152 |
| 5,361,386 | 11/1994 | Watkins et al. ............. | 395/130 |
| 5,446,833 | 8/1995 | Miller et al. ................ | 395/125 |

FOREIGN PATENT DOCUMENTS

| | | |
|---|---|---|
| 63-213079 | 9/1988 | Japan . |
| 03-138779 | 6/1991 | Japan . |

OTHER PUBLICATIONS

Devich et al.; *Rural Scene Perspective Transformations*; 1981; pp. 54–66.

*Pattern Models*, Chapter 6: Display of Height Fields; John Wiley & Sons; 1983; pp. 284–300.

Rogers, David F.; *Procedural Elements for Computer Graphics*, section 5–11 Texture; 1985, pp. 354–363.

Heckbert, Paul S.; *Survey of Texture Mapping*; 1986; pp. 207–212.

Oka et al.; *Real–Time Manipulation of Texture–Mapped Surfaces*; 1987; pp. 181–188.

Ohshima et al.; *An Animation Design Tool Utilizing Texture*; 1989; pp. 337–342.

Blinn, James F.; *The Truth About Texture Mapping*; 1990; pp. 78–83.

Liedtke et al.; *Shape Adaptation for Modelling of 3D Objects in Natural Sciences*; 1991; pp. 704–705.

(List continued on next page.)

*Primary Examiner*—Joseph H. Feild
*Assistant Examiner*—Rudolph Buchel
*Attorney, Agent, or Firm*—Fay Sharpe Beall Fagan Minnich & McKee

[57] ABSTRACT

A plurality of texture data of a surface of an object to be displayed as viewed from a plurality of assumed directions are stored in a texture memory. When a CPU sends to a graphic processor information specifying a shape of the surface, a direction to view the surface and a texture in the texture memory as a command, a geometric operation unit produces read information of the texture memory based on the input information. A triangle generator reads the texture data corresponding to the view direction of the surface of the object by the read information for texture mapping. An image of the texture mapped image of the surface of the object is stored in a frame memory and displayed on a monitor. When there is no texture data corresponding to the view direction, a plurality of texture data closest thereto are read from the texture memory and interpolated to produce an appropriate texture data.

14 Claims, 12 Drawing Sheets

OTHER PUBLICATIONS

Crawfis et al.; *A Scientific Visualization Synthesizer*; 1991; pp. 262–268.

Becker et al.; *Smooth Transitions Between Bump Rendering Algorithms*; 1993; pp. 183–190.

Max et al.; *Bump Shading for Volume Textures*; pp. 18–20.

Azarbayejani et al.; *Recursive Estimation for CAD Model Recovery*; 1994; pp. 90–97.

Braccini, C. et al, "A Tool for Artificial Reality: from views to Object Representation", *IEEE International Workshop on Robot and Human Communication, Apr. 1992, pp. 222–226*.

Hsu, R., et al, "Human Arm Modeling for Analysis/Synthesis Image Coding", *IEEE International Workshop on Robot and Human Communication, Jul. 1993, pp. 352–355*.

Erickson, et al, "Stimulation gets a new look", (Computer Generated Synthesized Imagery), Defense Electronics, v.16 p. 76(9), Aug. 1984.

Longuet–Higgine, "A computer algorithm for reconstriction a scene from two projection", Nature, MacMillian Journals LTD., vol. 293, Sep. 10, 1981.

Shirota, K. "The Latest Three–Dimensional Computer Graphics," ASCII Publishing Co., Ltd., 1991, pp. 143–146. (provided in Japanese).

Foley. *Computer Graphics: Principles and Practice*, Second Edition, Addison–Wesley Publishing Company, Inc., 1990, Chapter 18.7, pp. 882–887. (provided in English).

METHOD AND APPARATUS FOR MAPPING TEXTURE ON AN OBJECT DISPLAYED AT A VARYING VIEW ANGLE FROM AN OBSERVER

This is a file-wrapper continuation of application Ser. No. 08/371,367 filed on Jan. 11, 1995 now abandoned.

BACKGROUND OF THE INVENTION

The present invention relates to display of a three-dimensional graphics image, and more particularly to texture mapping method and apparatus which permit real display of an object surface including feeling of unevenness as well as a pattern and feeling of material.

JP-A-3-138779 discloses the use of the texture mapping in order to confirm an effect of ornamental design in computer-aided design (CAD). The texture mapping relates to a technique in which instead of displaying a graphic image by precisely defining it to the detail, a surface of the object to be displayed is approximated by a relatively simple approximate polygon mesh and an image representing a pattern, material and unevenness (which is called texture or texture map) is pasted on the surface of the object (namely, mapped) to represent the pattern, the feeling of material and the feeling of unevenness on the surface of the object.

In this method, the object to be displayed is represented by an approximate polygon mesh. When the texture mapping is effected on the surface of such a polygon mesh, the following process is carried out.

First, assuming that the polygon is illuminated by a light source, a brilliance of each vertex of the polygon is determined by calculation based on a position and an intensity of the light source, a material of the object (therefore a light reflection coefficient) and a vertex normal. In this manner, the brilliance of each vertex of the polygon is determined.

On the other hand, the texture is a pattern represented by an intensity and a color and the intensity and the color of each point of the texture are represented by numeric values which are referred to as texture values. The texture is defined on a coordinate system called a texture coordinate and each point in the texture corresponds to a coordinate position in the texture coordinate in one-to-one correspondence. The intensity and color numeric values at the position of the texture, that is, the texture values corresponding to the coordinate position are set at the coordinate position in the texture coordinate system. The texture values are stored as the texture data in a memory having addresses corresponding to the coordinate positions in the texture coordinate system. In this manner, various textures may be stored in the memory. In order to map the texture on the surface of the polygon, the coordinate positions in the texture coordinate system of the texture to be mapped are set in association with the vertexes of the polygon. Namely, which coordinate position in the texture coordinate system is to be associated with the vertex of the polygon is determined. When the coordinate positions of the texture coordinate system for the vertexes of the polygon are determined, the coordinate positions in the texture coordinate system for the pixels in the polygon are determined by the interpolation from the determined coordinate positions of the vertexes. The texture data is accessed from the memory by using the coordinate positions including the vertexes of the polygon thus determined, and the texture data is combined with the corresponding brilliance values determined in the manner described above and written into a frame memory. The polygon texture mapped by the data of the frame memory is displayed.

In order to represent the feeling of unevenness of the object, bump mapping has been proposed, as shown in "The Latest Three-Dimensional Computer Graphics" translated by K. Shirota, ASCII Publishing Co., 1991, pp. 143–146, in which directions of normal vectors to respective points on an approximate polygon mesh are changed in accordance with fine unevenness on a surface of an object and brilliance for the respective normal lines are determined for display.

In the above texture mapping, the pattern and the feeling of material of the detail of the object surface can be represented, and the feeling of unevenness is attained to some extent for the display of a still graphic image. However, when a moving object is to be displayed or a viewing direction is changed for a still object, that is, when animation display is to be made, a change of brilliance due to fine unevenness which is inherently present on the object does not occur in the calculation of brilliance even if the direction of the plane of the approximate polygon mesh changes except that the brilliance changes uniformly because the texture mapping is effected to the plane of the approximate polygon mesh.

Let us assume to display a part, such as a tuning knob for a stereo-sonic equipment, having a knurled metal surface which glitters differently depending on viewing directions. By considering the fact that the light reflection factor and the light refractive index of a part vary with viewing directions, the part can be displayed by changing values of the reflection factor and refractive index according to viewing directions.

JP-A-63-213079 discloses how to change values of the reflection factor and refractive index for each pixel of texture data, where the above method of changing values is applied to a texture mapping technique. The method of JP-A-63-213079 can express difference of glitter of a part for example with fine grooved lines depending on difference of viewing directions, but is difficult to express changes of a pattern on a relatively large surface of an object depending on difference of viewing directions.

When the bump mapping is applied to the animation display, the feeling of unevenness is represented, because the brilliance of fine areas ununiformly change with the change of normal vectors each time the direction of the surface changes. However, to this end, the brilliance calculation is required for each pixel and it is very difficult to display the animation with a presently available conventional hardware because a processing time is too long.

The texture mapping and the bump mapping are now explained in connection with a driving simulator.

The driving simulator is used for training of driving technique. When an operator operates a simulated driving mechanism while he/she watching a scene (including an object 30) displayed on a screen 80 of a display device 8 as shown in FIG. 12, the scene on the screen changes as the operator manipulates so that it imposes to the operator a feeling as if he/she were actually driving a car.

In FIG. 13, a car 20 passes by an object 30. When the position of the car 20 moves from a position P1 to a position P4, an external view of the object 30 as viewed from the driver should change in accordance with the change of the car position. Accordingly, by changing the pattern of a portion of the object 30 displayed on the screen 80 of FIG. 12 in accordance with the position of the car 20, the operator who manipulates the driving simulator is presented with higher feeling of reality.

The object 30 may be a series of buildings or walls of buildings. In many cases, there are unevenness on the surfaces thereof as shown in FIG. 13. It is preferable that the unevenness changes on the screen 80 as the operator of the driving simulator manipulates. For the purpose of high-speed display, it is usual to map a pattern expressing a row of buildings or walls of buildings on a rectangular display area displayed as the object 30.

In the texture mapping described above, it is effective to the presentation of the feeling of unevenness for the display of a still image, but it presents only planar representation for animation display. The bump mapping has been proposed to compensate it but it takes too long processing time with a conventional hardware and a large scale hardware is required to attain animation display with satisfactory feeling of reality.

SUMMARY OF THE INVENTION

It is an object of the present invention to provide texture mapping method and apparatus which permit the representation of a feeling of unevenness as well as a pattern and feeling of material even in animation display with a simple hardware configuration.

One of big factors for a human to feel unevenness is considered to be due to a change in a pattern and change in a brilliance of a surface detail of an object when the object moves or a view point to the object moves. Referring to FIGS. 2A–2D, a relation between the feeling of unevenness and the position of the view point or the position of the object is explained specifically.

FIG. 2A shows a surface with unevenness. Numerals 100 and 101 denote projected areas having flat surfaces and equal width and arranged at a constant pitch. In order to more clearly show the projected surfaces 100 and 101, the surfaces are viewed from slightly lefthand side. Those surfaces are illuminated from the front.

When the surfaces are viewed from the left top direction D1 while the positional relation between the surfaces and the light source is fixed, left sides 100a and 101a of the projected areas 100 and 101 which are not well illuminated appear, and a spacing between longitudinally extending lines representing edges is not uniform as shown in FIG. 2B. On the other hand, when the surfaces are viewed from the front top direction D2, longitudinally extending lines of equal spacing appeared as shown in FIG. 2C. When the surfaces are viewed from the right top direction D3, the right sides 100b and 101b of the projected areas 100 and 101 appear as shown in FIG. 2D and the longitudinally extending lines are not of equal spacing.

In this manner, as the view point position to the object changes, the pattern changes in accordance with the unevenness. This is considered as on factor for causing the feeling of unevenness.

In order to achieve the above object, in accordance with the present invention, the display of the feeling of the unevenness of the animation image is attained in the following manner.

A plurality of directions to view the surface of the real object or the surface of the object generated by the computer graphics corresponding to the texture data, are assumed, and different texture data is provided for each of the different directions and when the object is displayed, the texture data corresponding to the direction of viewing the surface of the object is selected for mapping.

When the texture data is selected, if the actual direction to view the surface of the object does not match to the assumed direction, the texture data for a plurality of assumed directions which are close to the actual direction may be selected and the selected texture data may be interpolated based on an error between the actual viewing direction and the assumed direction, and the resulting data may be mapped as texture data to the actual view direction to the surface of the actual object to be displayed.

By effecting the texture mapping in the manner described above, the texture data changes as the view point or the display image moves without using the bump mapping, and the pattern and the brilliance changes with the unevenness so that the feeling of unevenness is attained. Since only one of a plurality of textures is selected, the processing may be conducted in the substantially same time as that of the conventional texture mapping processing.

Even if there is no texture data which strictly corresponds to the actual viewing direction as the view point or the display image moves, the texture data to a plurality of assumed directions close thereto are interpolated to generate the texture data for the actual viewing direction. Accordingly, the pattern does not change abruptly as texture data to be mapped is selected for the change of the viewing direction and the display of natural image is attained.

DESCRIPTION OF THE PREFERRED EMBODIMENTS

An embodiment of the present invention is now explained in connection with the texture mapping display of the present invention in a driving simulator.

Figure 1:
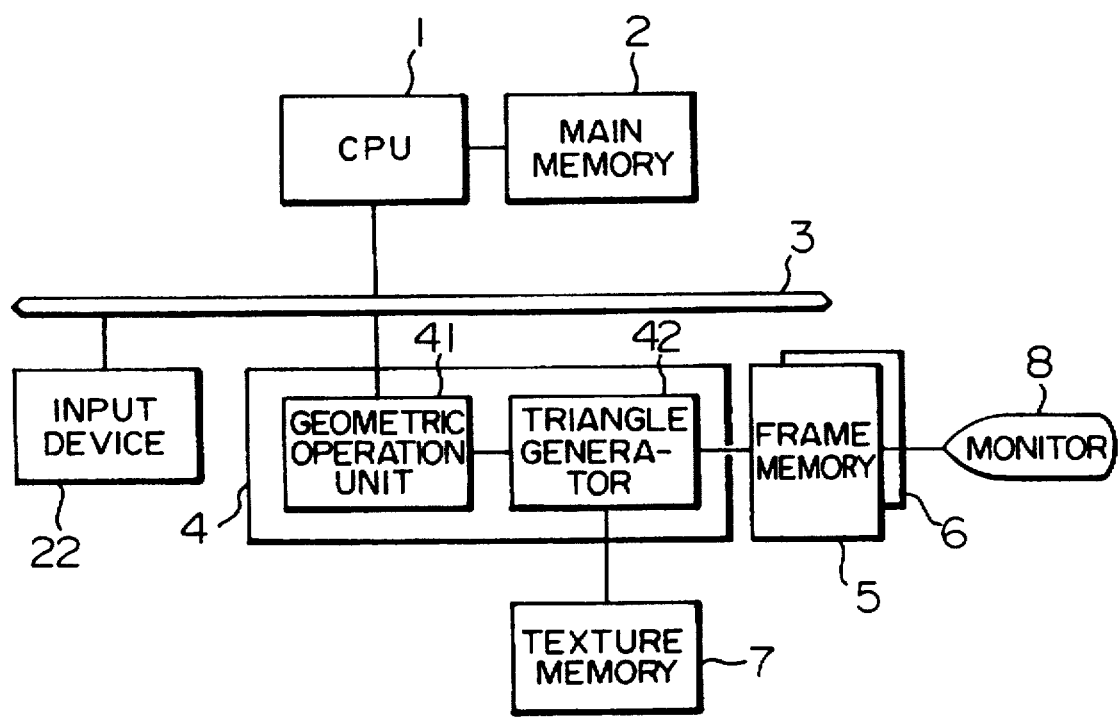
FIG. 1 shows a block diagram of one embodiment of the texture mapping method and apparatus of the present invention.
Figure 2A:
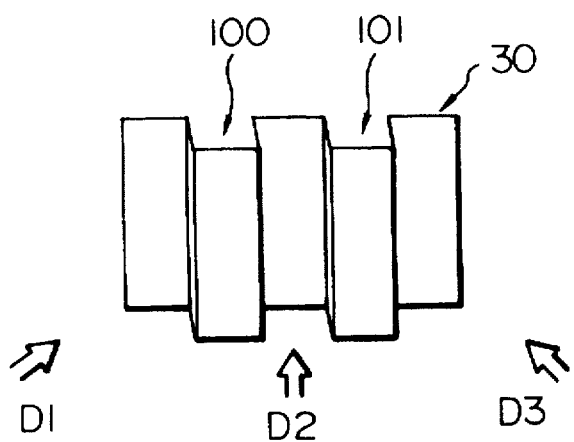
FIGS. 2A–2D show how an uneven surface appears by the change of a position of view point.
Figure 2B:
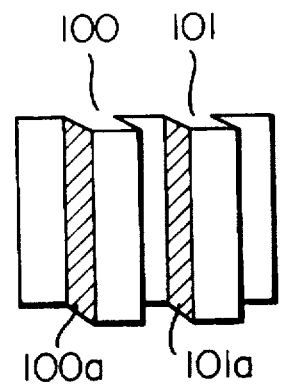
Figure 2C:
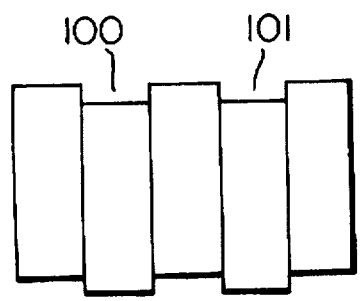
Figure 2D:
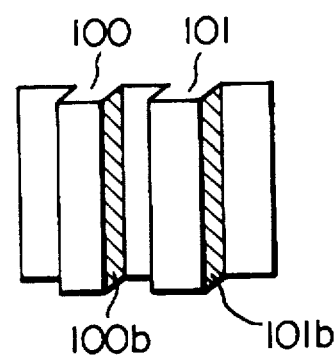

FIG. 1 shows a block diagram of one embodiment of the texture mapping method and apparatus of the present invention. Numeral 1 denotes a CPU (central processing unit), numeral 2 denotes a main memory, numeral 3 denotes a system bus, numeral 4 denotes a graphic processor, numeral 41 denotes a geometric operation unit, numeral 42 denotes a triangle generator, numeral 5 denotes a frame memory, numeral 6 denotes a Z buffer, numeral 7 denotes a texture memory, numeral 8 denotes a monitor, and numeral 22 denotes an input device.

In FIG. 1, the CPU 1 controls the overall system such as the management of graphic data and the start of the graphic processor 4 for displaying a three-dimensional graphic image display having the texture mapping applied thereto in accordance with the input from the input device 22 operated by an operator (not shown). The main memory 2 stores the graphic data and holds the program for controlling the display. The CPU 1 and the graphic processor 4 are connected through the system bus 3. The graphic processor 4 conducts the display process by a drawing command from the CPU 1 and comprises the geometric operation unit 41 and the triangle generator 42 for drawing a texture mapped triangle on the frame memory 5. The image of the object formed on the frame memory 5 is sent to the monitor 8. The Z buffer 6 is used for the hidden surface elimination to suppress the display of a portion of the image which are hidden by other image. The texture memory 7 stores the texture data for each of the viewing directions when the surface of the object to be displayed is viewed from a predetermined assumed viewing directions. The input device 22 converts the manipulation of the operator to the driving simulator, that is, the manipulation to simulated steering wheel and accelerator to data decodable by the CPU 1 and sends it to the main memory 2.

Figure 3:
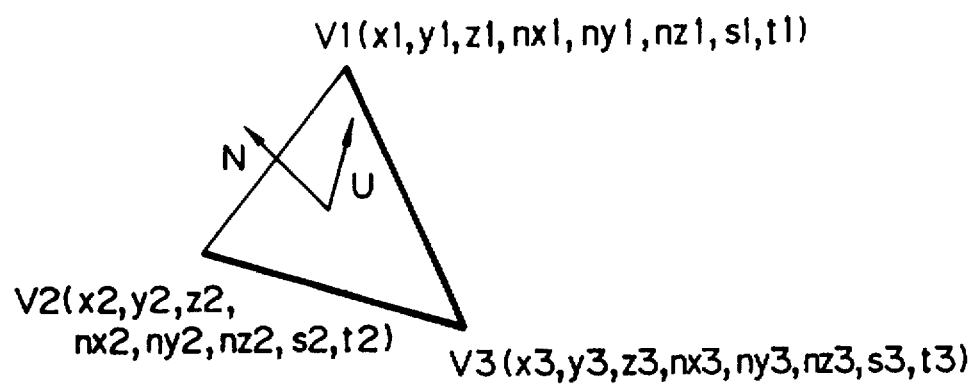
FIG. 3 illustrates a method for defining a triangle, FIG. 4 illustrate a position of the rectangle in a texture coordinate system.
Figure 4:
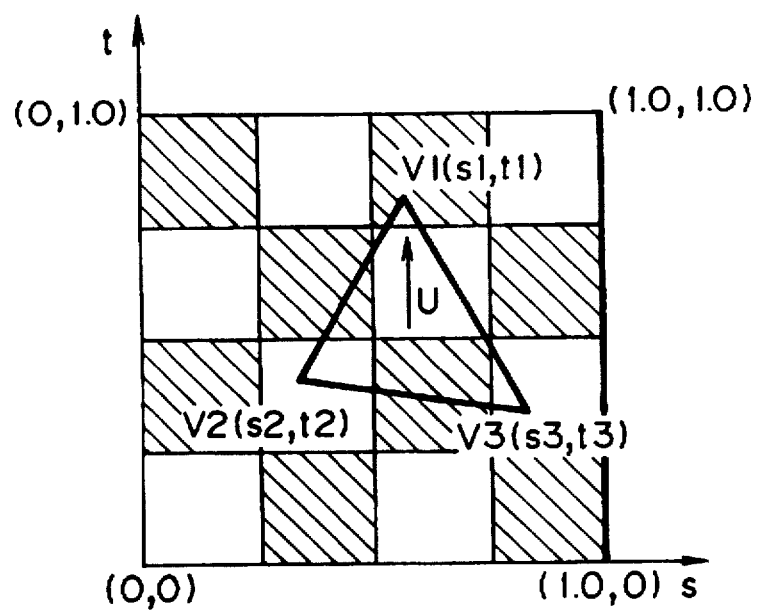

Referring to FIGS. 3–5, the triangle defining information sent from the CPU 1 to the graphic processor 4 is generally explained.

FIG. 3 illustrates a method for defining a triangle. The triangle is generally defined on a modeling coordinate system which is a graphics defining coordinate system by a coordinate $(x_j, y_j, z_j)$ of each vertex, a normal vector $(nx_j, ny_j, nz_j)$ at each vertex, a coordinate $(s_j, t_j)$ at each vertex in the texture coordinate, a plane normal vector N and a texture up vector U, where j is one of 1, 2 and 3. As shown, the vertexes $V_1$, $V_2$ and $V_3$ of the triangle are represented on the modeling coordinate system by:

$V_1(x_1, y_1, z_1, nx_1, ny_1, nz_1, s_1, t_1)$ $V_2(x_2, y_2, z_2, nx_2, ny_2, nz_2, s_2, t_2)$ $V_3(x_3, y_3, z_3, nx_3, ny_3, nz_3, s_3, t_3)$ and the plane normal vector N and the texture up vector U are set thereto to define the triangle. The texture up vector represents the up direction of the texture to be mapped. The plane normal vector N may be calculated based on the vertexes of the triangle and the texture up vector U may be calculated based on the coordinates of the vertexes and the coordinate of the texture.

FIG. 4 shows a texture coordinate system. An example of the texture having a chess board pattern is shown. A positional relation of the triangle to the texture when the texture of the triangle shown in FIG. 3 is mapped is also shown. The texture coordinate system is a two-dimensional coordinate system having orthogonal s and t coordinate axes, and a texture definition area in the texture coordinate system is $0 \leq s \leq 1.0$ and $0 \leq t \leq 1.0$, which is a normalized two-dimensional space.

The position of the triangle in the texture coordinate system is determined by the coordinate $(s_j, t_j)$ of each vertex of the triangle in the texture coordinate system (where $s_j$ is a value along the s coordinate axis and $t_j$ is a value along the t coordinate axis, and $0 \leq s_j$ and $t \leq 1.0$) and the position of the triangle in the texture coordinate system is determined by the coordinates $V_1(s_1, t_1)$, $V_2(s_2, t_2)$ and $V_3(s_3, t_3)$ of the respective vertexes of the triangle as shown in FIG. 4. In other words, the texture of the chess board pattern within that range is mapped to the triangle. The direction of the texture up vector U of the triangle corresponds to the direction of the t coordinate axis of the texture coordinate system.

The graphic to be displayed in triangle in the present embodiment, but in general, the object to be displayed is represented by an approximate polygon mesh. Since the polygon may be divided into triangles, the generality is not lost by explaining by the triangle. When the graphics to be displayed is a polygon, it is divided into triangles as a preprocess and same process may be applied to each triangle.

In order to conduct the texture mapping display process, the information on the material of the surface of the object to be displayed (that is, attribute information such as a light reflection coefficient and a transparency) and the data for the texture used are required, and it is now assumed that they have been specified.

FIGS. 5A–5D show patterns of the surface of the object when an object 30 having the unevenness as shown in FIG. 2 is viewed from the positions P1–P4 of the car 20 of FIG. 3. In FIGS. 5A–5D, the upper views show a lateral section of the surface of the object and the lower views show the textures TX1–TX4 when the surface of the object is viewed from the direction of the arrow shown above the horizontal plane.

Figure 5A:
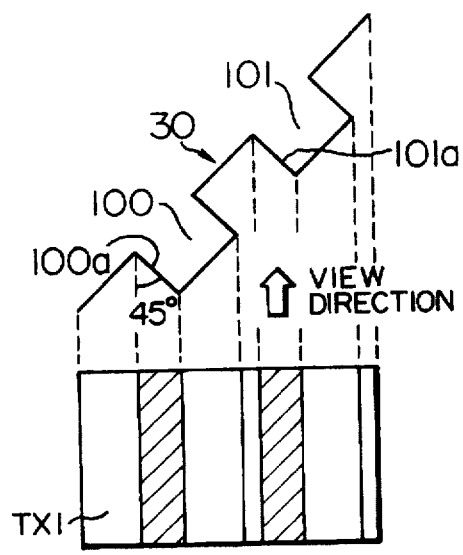
FIGS. 5A–5D show examples of texture data.
Figure 5B:
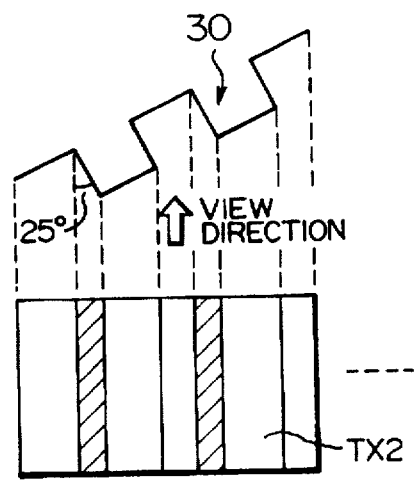
Figure 5C:
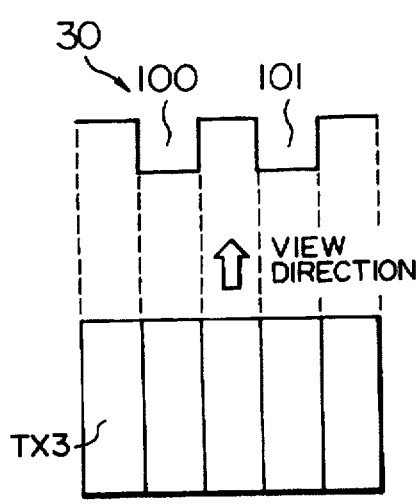
Figure 5D:
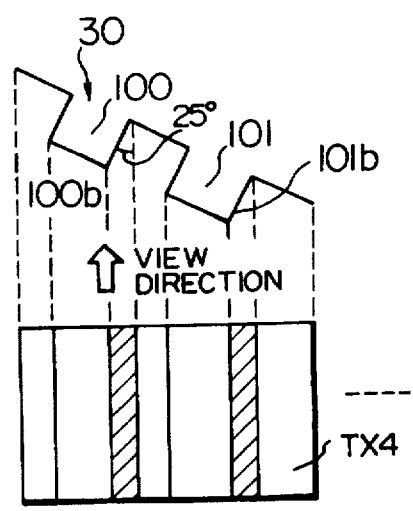

FIG. 5A shows the texture data TX1 when the driver views it from the position P1 of the car, that is, from approximately 45 degrees leftward of the surface of the object 30. The left sides 100a and 101a of the two projected areas 100 and 101 appear differently from other area as shown by hatching. FIG. 5B shows the texture data TX2 when viewed from the position P2 of the car, that is, approximately 25 degrees leftward of the surface if the object 30. In this case, the left sides 100a and 101a of the two projected areas 100 and 101 appear differently from other area although it is less different than that in FIG. 5A. FIG. 5C shows the texture data Tx when viewed from the position P3 of the car, that is, from the front of the surface of the object 30. The sides of the two projected areas 100 and 101 do not appear. FIG. 5D shows the texture data TX4 when viewed from the position P4 of the car, that is, approximately 25 degrees rightward of the object 30. The right sides 100b and 101b of the two projected areas 100 and 101 appear differently from other area as shown by hatching. In this manner, the textures of the same object change as the direction of view point changes.

Figure 6:
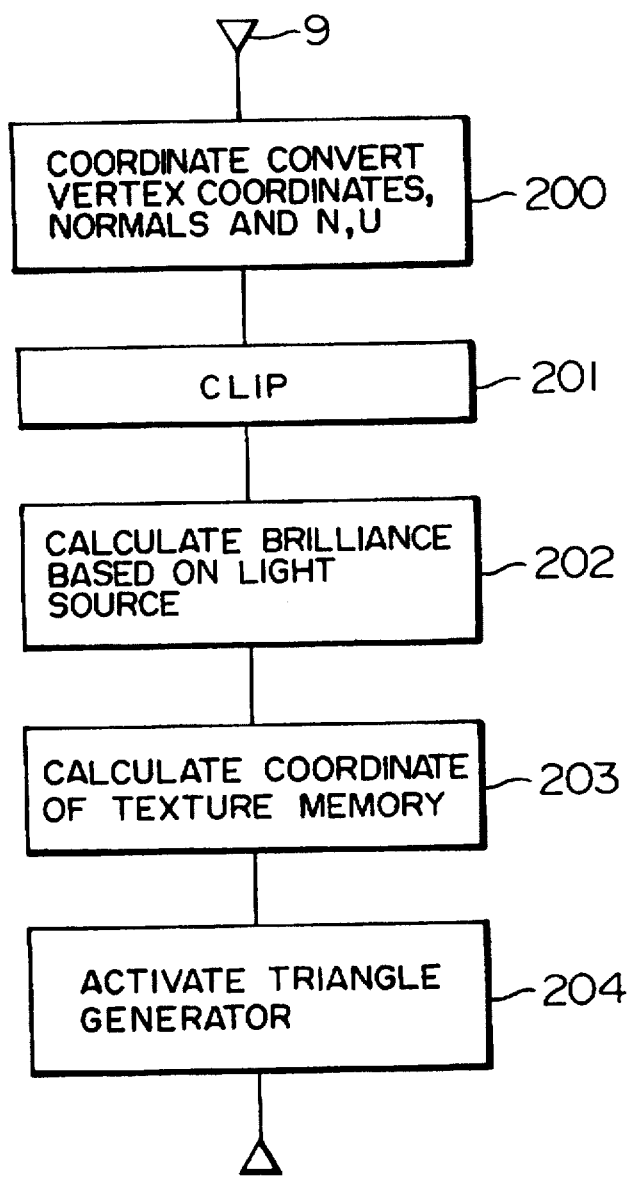
FIG. 6 shows a flow chart of a processing operation of a geometric operation unit in FIG. 1.

The triangle defining information shown in FIG. 3 is sent from the CPU 1 to the graphic processor 4 of FIG. 1 in the form of draw command. In the graphic processor 4, a process shown in FIG. 6 is conducted by the geometric operation unit 41.

The coordinates of the vertexes of the triangle, the normal vector, the plane normal vector N and the texture up vector U are converted to the view point coordinate system (step 200), and an image beyond the display area is clipped (step 201). Next, based on the position and the intensity of the light source, the normal lines to the vertexes of the triangle and the light reflection factor of the surface of the object to be displayed, the brilliance (shading brilliance) $R_j$, $G_j$ and $B_j$ of the respective vertexes are calculated (step 202). The brilliance calculation is conducted in the three-dimensional graphics and it does not directly relates to the present invention and hence detailed description thereof is omitted.

Then, the texture data through the direction viewing the triangle under consideration (the viewing direction) is selected from the texture memory 7 (step 203).

Figure 7A:
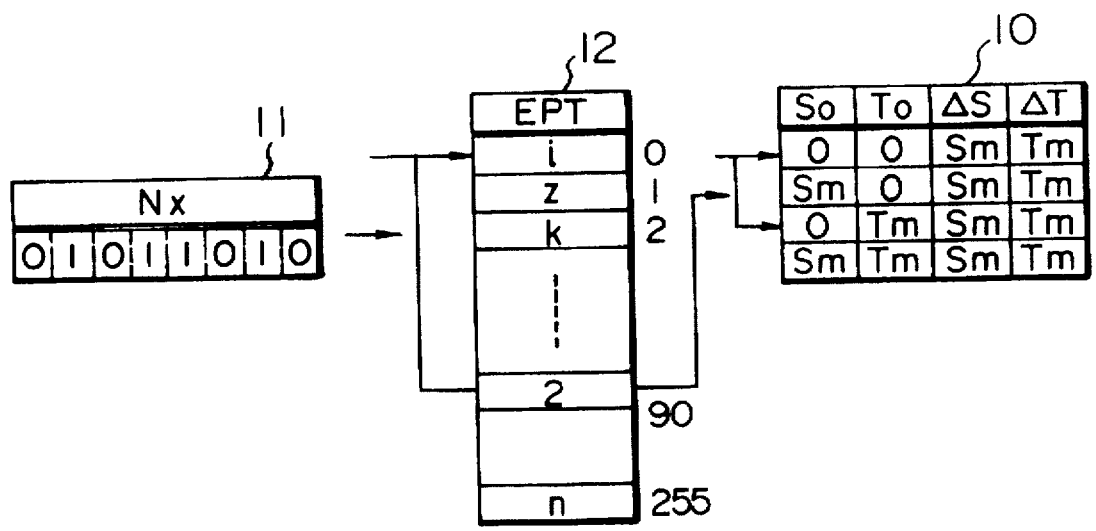
FIGS. 7A and 7B shows a process of a step 203 in FIG. 6.
Figure 7B:
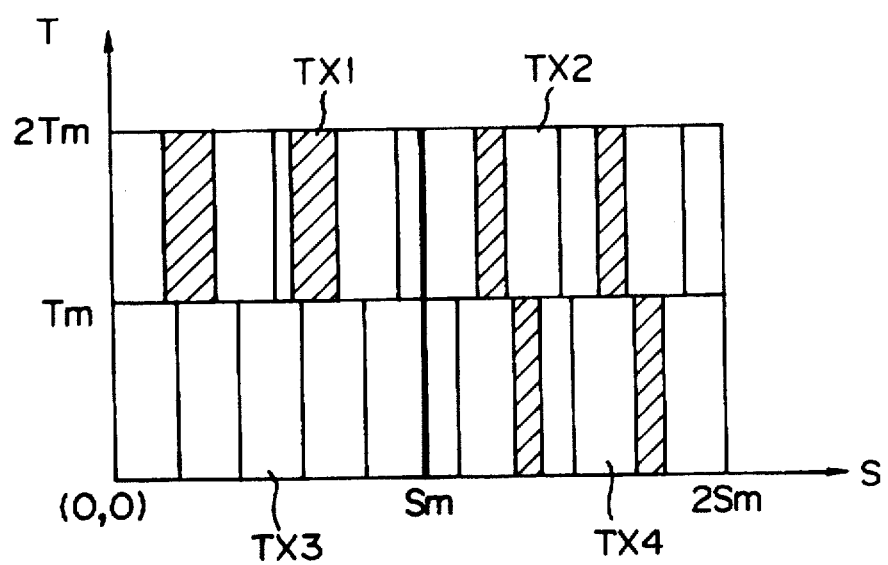

Referring to FIGS. 7A and 7B, detail of the selection process is explained. In order to facilitate the understanding, it is assumed that one of the texture data TX1-TX4 shown in FIGS. 5A-5D is entirely selected and it is mapped to the surface of the object 30, i.e., a rectangular area.

In FIG. 7A, the texture data management table 10 stores the data indicating the store positions on the texture memory 7 of the texture data TX1-TX4 as viewed from the assumed directions. As shown in FIG. 7B, the store positions of the texture memory 7 are represented by the S-T coordinate system. Each of the texture data TX1-TX4 contains the data representing the left bottom coordinate ($S_o$, $T_o$) of the texture and the magnitudes thereof ($\Delta S$, $\Delta T$) in the S-T coordinate systems as the data for representing the store position in a corresponding row in the texture management table 10. This area actually represents the range of address in the texture memory 7. Four texture data TX1-TX4 are stored in the texture memory 7 in the present embodiment. In the texture data management table 10 in FIG. 7A, for the texture data TX1, 0, $T_m$, $S_m$ and $T_m$ are stored as the values of $S_o$, $T_o$, $\Delta S$ and $\Delta T$.

It is assumed that the texture memory 7 stores only the texture data TX1-TX4 representing the patterns when the surface of the object 30 is viewed from various directions although the texture data of other patterns may be stored.

The data in the texture data management table 10 may be accessed by a displacement in a register as shown in FIG. 7A. The displacement 11 is information $N_x$ representing the plane normal N converted to the view point coordinate system with 8-bit precision. The texture data management table 10 stores the data ($S_o$, $T_o$, $\Delta S$, $\Delta T$) corresponding to the value of the displacement 11 at each address. Accordingly, the texture data management table 10 my be accessed by the displacement 11. In the present embodiment, the displacement 11 is "01011010", that is, the x component $N_x$ of the plane normal at the position P1 of the car. The pointer table 12 is referred by this value to obtain the entry number (EPT) of the texture management table 10, that is, 2. Base on this, the position of the texture data TX1 corresponding to the EPT 2 is derived. That is, the values of ($S_o$, $T_o$, $\Delta S$, $\Delta T$) are derived as (0, $T_m$, $S_m$, $T_m$). $S_m$ represents a half length of the lateral or the S-axis length of the data virtual area in the texture memory 7, and $T_m$ represents a half length of the longitudinal or T-axis length.

In this manner, the texture data (TX1 in the present embodiment) including the direction of the triangle forming the surface of the object 30 (namely, the direction of view line) is read from the texture memory 7.

In the step 203 of FIG. 6, the coordinates of the vertexes of the triangle in the S-T coordinate system of the texture memory are calculated based on the data ($S_o$, $T_o$, $\Delta s$, $\Delta T$) derived from the texture data management table 10. Assuming that the coordinate position in the texture coordinate system (s, t) of the j-th vertex (j=1, 2, 3) normalized from 0 to 1.0 is ($s_j$, $t_j$), the coordinate position ($S_j$, $T_j$) of the vertex in the S-T coordinate system which is the coordinate system in the texture memory 7 is represented by:

$$S_j = S_o + s_j * \Delta S \qquad (1)$$

$$T_j = T_o + t_j * \Delta T \qquad (2)$$

where * represent multiplication.

In this manner, the positional relation of the triangle to the texture is determined in the S-T coordinate system of the texture memory 7.

In FIG. 6, the coordinate position of each vertex of the triangle is converted to the coordinate position ($X_j$, $Y_j$, $Z_j$) of a device coordinate system which is the coordinate corresponding to the display screen of the monitor 8 (FIG. 1), and the coordinate positions ($X_j$, $Y_j$, $Z_j$) of the vertexes of the triangle, the coordinate positions ($S_j$, $T_j$) of the S-T coordinate system of the texture memory 7 and the brilliance ($R_j$, $G_j$, $B_j$) are sent to the triangle generator 42 (FIG. 1) to draw the triangle (step 204).

The geometric operation unit 41 for the above process may comprise a microprocessor, a memory, a floating point arithmetic unit and software for controlling those units.

Figure 8:
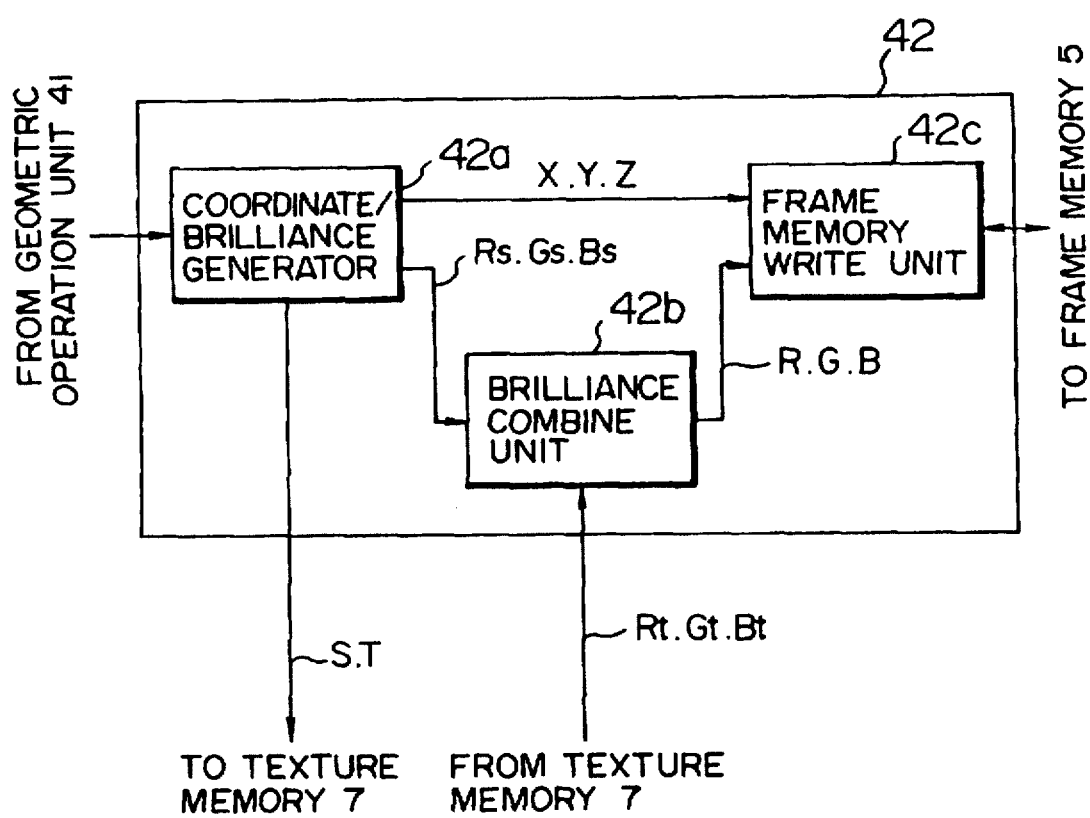
FIG. 8 shows a block diagram of an embodiment of a triangle generator in FIG. 1.

The triangle generator 42 of FIG. 1 receives the parameters from the geometric operation unit 41 and draws the texture mapped triangle on the frame memory 5. Referring to FIG. 8, an embodiment of the triangle generator 42 is explained. In FIG. 8, numeral 42a denotes a coordinate/brilliance generator, numeral 42b denotes a brilliance combine unit and numeral 42c denotes a frame memory write unit.

In the coordinate/brilliance generator 42a, the coordinate positions ($X_j$, $Y_j$, $Z_j$) in the device coordinate system of the respective vertexes of the triangle supplied from the geometric operation unit 41, the coordinate positions ($S_j$, $T_j$) in the S-T coordinate system of the texture memory 7 and the brilliance ($R_j$, $G_j$, $B_j$) are interpolated so that the coordinate positions ($X_p$, $Y_p$, $Z_p$) in the device coordinate system of the respective pixels in the triangle, the coordinate positions ($S_p$, $T_p$) in the S-T coordinate system and the shading brilliances ($R_{sp}$, $G_{sp}$, $B_{sp}$) are sequentially generated. (those coordinate positions and the shading brilliance include those for the vertexes of the triangle.) The coordinate positions ($X_p$, $Y_p$, $Z_p$) are sent to the frame memory write unit 42c, the coordinate positions ($S_p$, $T_p$) are sent to the texture memory 7 (FIG. 1), and the shading brilliances ($R_{sp}$, $G_{sp}$, $B_{sp}$) are sent to the brilliance combine unit 42b.

The texture brilliance ($R_{tp}$, $G_{tp}$, $B_{tp}$) are read from the texture memory 7 by the coordinate positions ($S_p$, $T_p$) from the coordinate/brilliance generator 42a and they are supplied to the brilliance combine unit 42b which combines the shading brilliance ($R_{sp}$, $G_{sp}$, $B_{sp}$) and the texture brilliance ($R_{tp}$, $G_{tp}$, $B_{tp}$) in the manner shown in the following formulas to produce the pixel brilliance ($R_p$, $G_p$, $B_p$).

$$R_p = R_{sp} * R_{tp} \qquad (3)$$

$$G_p = G_{sp} * G_{tp} \qquad (4)$$

$$B_p = B_{sp} * B_{tp} \qquad (5)$$

The brilliance ($R_p$, $G_p$, $B_p$) thus derived are sent to the frame memory write unit 42c.

In the frame memory write unit 42c, the coordinate positions ($X_p$, $Y_p$, $Z_p$) in the device coordinate system of the sequential pixels are supplied from the coordinate/brilliance generator 42a, and the brilliance ($R_p$, $G_p$, $B_p$) for the pixels of the supplied coordinate positions ($X_p$, $Y_p$, $Z_p$) are supplied from the brilliance combine unit 42b, and for each of the pixels, the Z value stored in the Z buffer 6 (FIG. 1) is compared with the $Z_p$ value sent from the coordinate/brilliance generator 42a, and if the pixel being processed is closer to the view point or the front, the supplied brilliance ($R_p$, $G_p$, $B_p$) is written into the frame memory 5 (FIG. 1) to update the Z value of the Z buffer 6 by the $Z_p$ value. If the pixel under process is more behind, the above process is not conducted. In this manner, a portion interrupted by the projected area of the texture is prevented from being displayed. Detail of the process of the coordinate/brilliance generator 42a, that is, the method for determining the coordinate positions of the pixels in the triangle by the interpolation is described in "Computer graphics: Principles and practice" Second Edition, by Foley, Addison-Wesley Publishing Company, Inc., (1990), Chapter 18.7.

Figure 12:
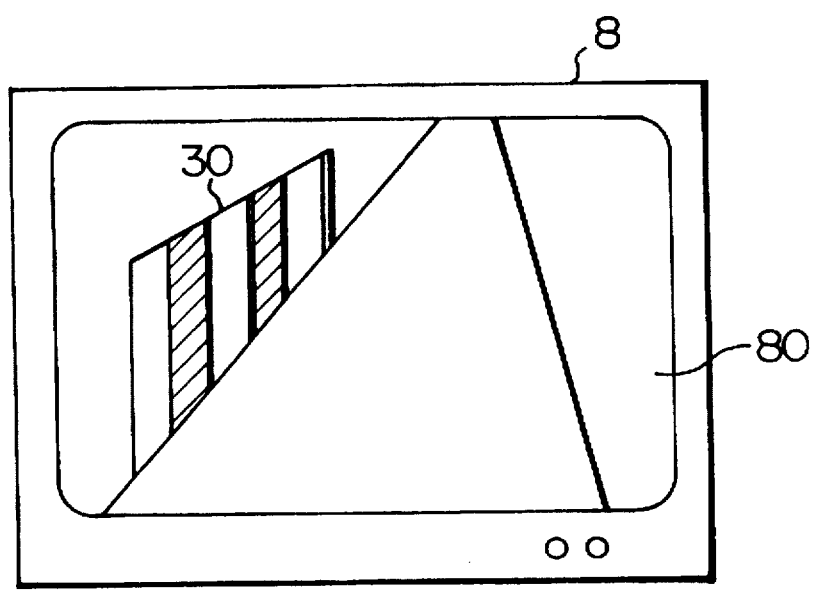
FIG. 12 shows an example of a display screen of a driving simulator.

In this manner, as shown in FIG. 12, the pattern as viewed from the 45 degrees leftward, that is, the display of the texture data TX1 is generated on the screen 80 of the monitor 8. It is to be noted that portion 30 on the monitor 8 is a planar area on which the feeling of unevenness is presented by the mapped texture pattern.

In the above description, of the prepared texture data, the texture data for the closest assumed direction to the view direction is selected from the texture memory 7. As a result, the texture data may be abruptly switched from one to the other as the view point or the object moves and the texture brilliance creates a discontinuous portion, which causes unnatural display of the image.

In order to prevent it, the texture data for a plurality of assumed directions which are closest to the view direction are selected and those texture data are interpolated in accordance with an error between the view direction and the assumed directions to determine the texture data for the view direction. As a result, the brilliance on the surface of the object to be displayed is continuous and a high grade display image is produced. A process therefor is explained below.

Assuming that the texture brilliance of texture data for two assumed directions closest to the view direction are ($R_{t1}$, $G_{t1}$, $B_{t1}$) and ($R_{t2}$, $G_{t2}$, $B_{t2}$) and a ratio of an angle difference between one of the two assumed directions and the view direction to an angle difference between the two assumed directions is given by an interpolation coefficient α, then the texture brilliance ($R_t$, $G_t$, $B_t$) of the texture data for the view direction is determined as $$R_t = \alpha R_{t1} + (1-\alpha) R_{t2} \quad (6)$$

$$G_t = \alpha G_{t1} + (1-\alpha) G_{t2} \quad (7)$$

$$B_t = \alpha B_{t1} + (1-\alpha) B_{t2} \quad (8)$$

Thus, when the view point or the display object moves, the pattern on the surface of the display object does not abruptly change.

This process may be attained by partially modifying the process of the geometric operation unit 41 and the triangle generator 42 of the graphic processor 4. This process is described below.

Figure 9:
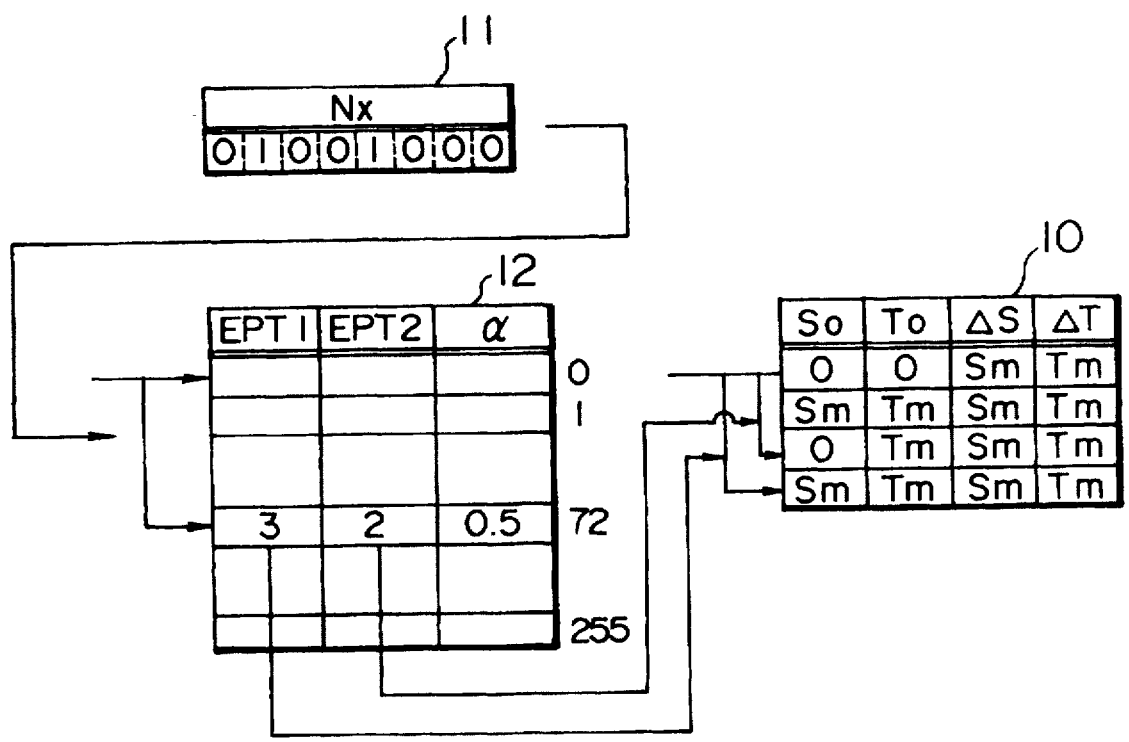
FIG. 9 illustrates a process of the step 203 in FIG. 6 when an interpolation process is conducted.

In the step 203 of FIG. 6, the geometric operation unit 41 determines a plurality of texture data for the assumed directions closest to the view direction. This is attained, as shown in FIG. 9, by holding a pointer pointing two closest texture data corresponding to the displacement 11 and an interpolation coefficient a in the pointer table 12 in addition to the process shown in FIG. 7. The pointer table 12 is accessed by the displacement 11 to determine the pointers P1 and P2 to the entry of the texture data management table 10 for the two assumed directions closest to the view direction set by the displacement 11, and the interpolation coefficient α. The texture data management table 10 is accessed by the pointers P1 and P2 to read the texture data for the two assumed directions closest to the view direction. When the 8-bit displacement il shown in FIG. 9 is "01001000", that is, it is intermediate of the positions P1 and P2 of the car shown in FIG. 13, the entry numbers (3 and 2) and the interpolation coefficient α (0.5) are read from the pointer table 12. Two texture data (TX1 and TX2) are selected from the texture data management table. The coordinate positions ($S_1$, $T_1$) and ($S_2$, $T_2$) in the S-T coordinate system of the texture memory are determined based on the texture data.

In addition to the coordinate positions in the device coordinate system of the vertexes of the triangle and the shading brightness, the two coordinate positions in the S-T coordinate system and the interpolation coefficient determined above are sent to the triangle generator 42. In a step 204 of FIG. 6, the following process is conducted by the triangle generator 42.

In FIG. 8, the coordinate-brilliance generator 42a generates the coordinate positions in the device coordinate of the pixels in the triangle, the coordinate positions in the S-T coordinate system and the shading brilliance based on the supplied parameters, and supplies the coordinate positions in the device coordinate system to the frame memory write unit 42c, the two coordinate positions in the S-T coordinate system to the texture memory 7 (FIG. 1), and the shading brilliance and the interpolation coefficient a to the brilliance combine unit 42b. The brilliance combine unit 42b receives two texture brilliance read from the texture memory 7 by the coordinate positions in the S-T coordinate system and conducts the interpolation operation of the formulas (6)–(8) by the two texture brilliance and the coefficient a to determine the texture brilliance for the view direction.

The texture brilliance thus determined is combined with the shading brilliance in accordance with the formulas (3)–(5) and processed in the manner described above.

Figure 10:
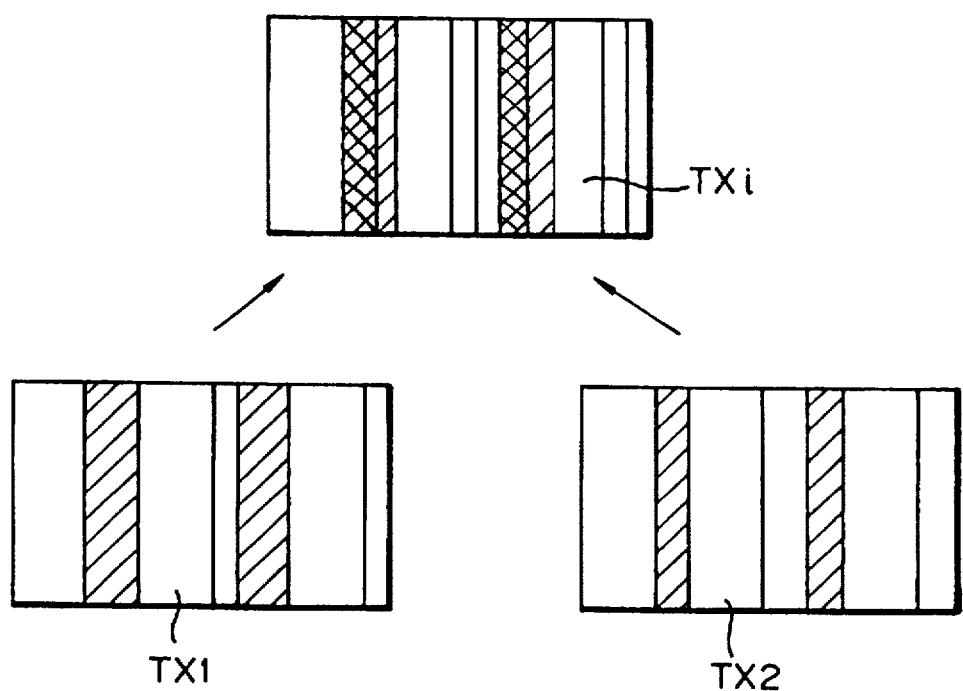
FIG. 10 shows an embodiment of the interpolation of the texture data.

In this manner, as shown in FIG. 10, the texture data TX1 and the texture data TX2 may be combined and the combined texture data TXi may be mapped to attain approximate display.

In this case, the portion on the side of the projected area is drawn outside of the hatched side area in the texture data TX2, and the wide area in the texture data TX1 is drawn with a weakened brilliance so that it appears as if it is the real width of the side area of the projected area.

Figure 11A:
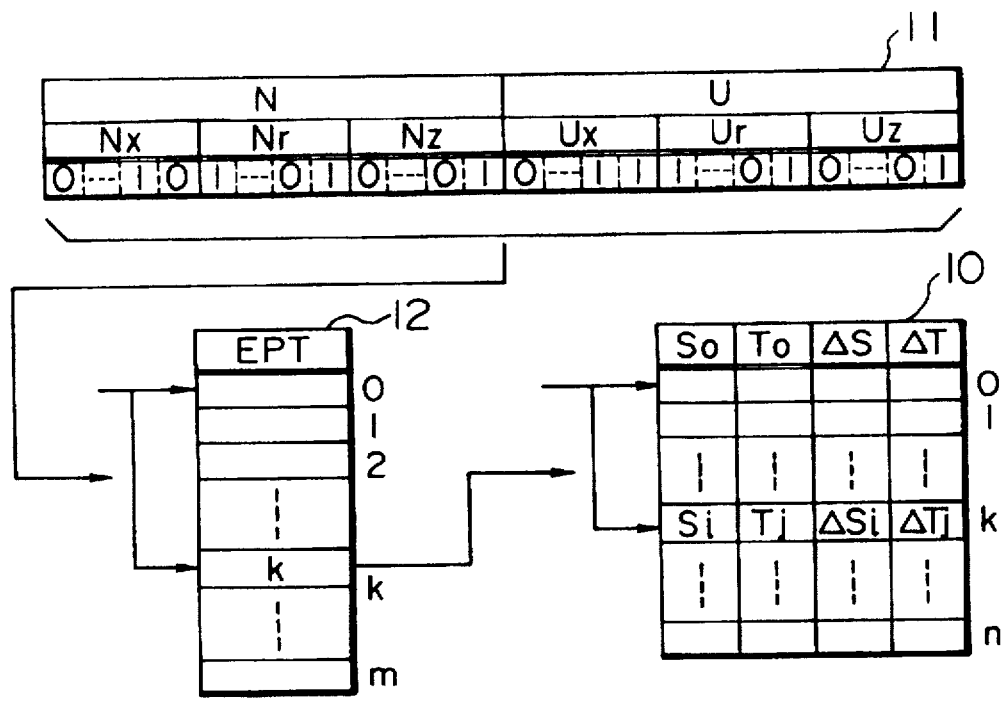
FIGS. 11A and 11B illustrate a process of the step 203 of FIG. 6 when the viewing direction changes in a complex manner.
Figure 11B:
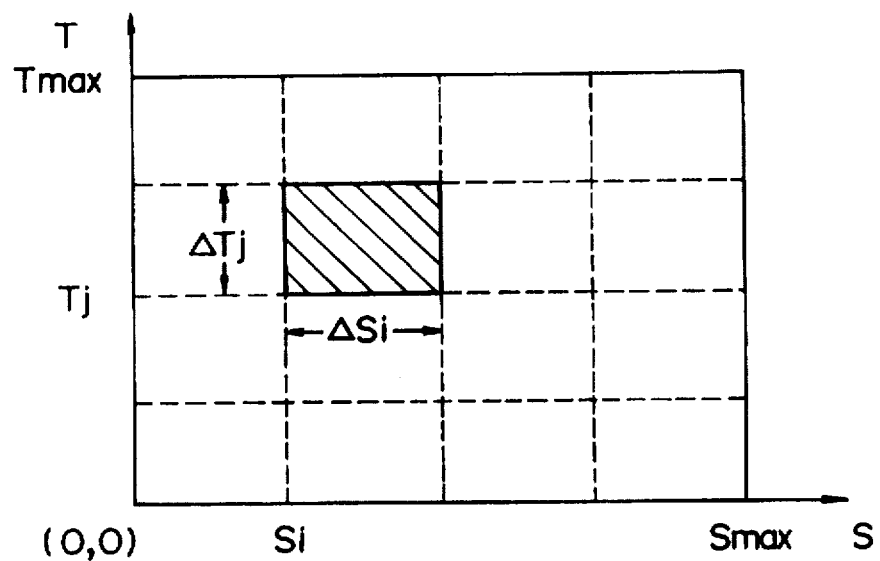
Figure 13:
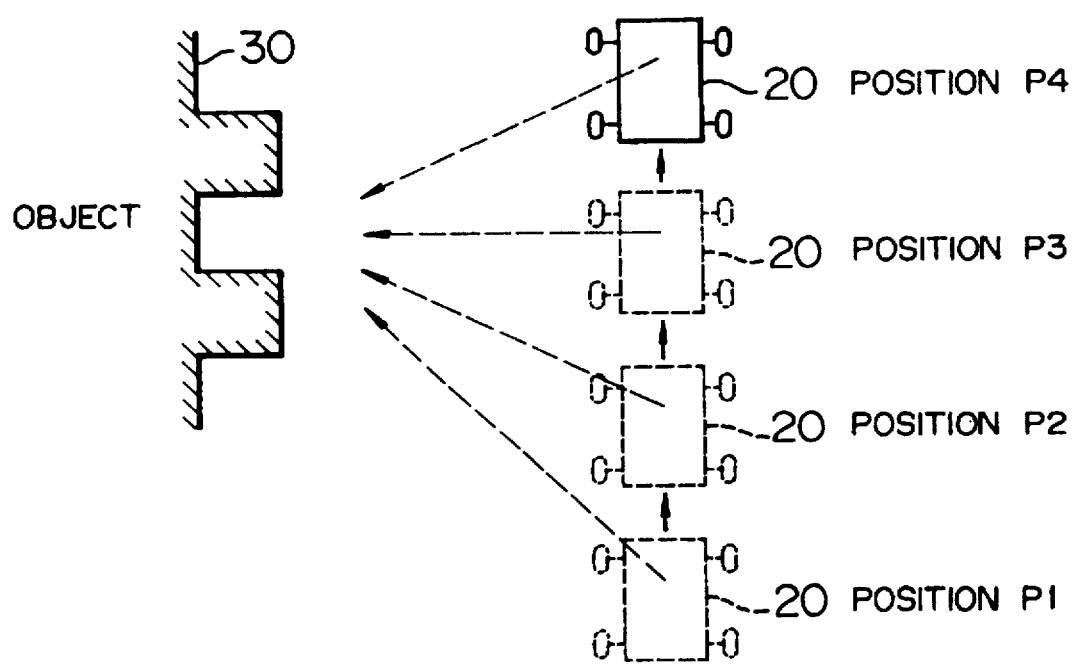
FIG. 13 illustrates a change of the surface of the object in accordance with a change of the viewing direction.

The change of the view point shown in FIG. 13 can be represented by only the X component of the plane normal in the view point coordinate system. Thus, the X component of the plane normal is used as the displacement 11. When the direction of the change of the view point cannot be specified, the displacement 11 may be the XYZ components of the plane normal N and the texture up vector U represented by a predetermined number of bits as shown in FIG. 11A, and it may be converted to the entry number EPT of the texture data management table 10 by the pointer table 12. As shown in FIG. 11B, by designating the left bottom position ($S_i$, $T_i$) and the longitudinal and lateral lengths ($\Delta S_i$, $\Delta T_i$) by the texture data on the texture memory 7 of the size of $S_{max}$ lateral by $T_{max}$ longitudinal, the four texture data described above as well as other various texture data can be held.

In accordance with the present invention, the texture data corresponding to the direction of the surface of the object to be displayed need only be mapped in the conventional method so that it may be processed in the substantially same processing time as that of the conventional texture mapping. Accordingly, when the animation image is to be displayed, the brilliance of the fine area of the object to be displayed changes to present the feeling of unevenness.

Further, the value derived by interpolating the texture data for the plurality of assumed directions closest to the view direction may be mapped so that the pattern changes naturally and smoothly and does not change abruptly even when the view point or the object moves.

What is claimed is:

1. A texture mapping method for mapping texture data on each of a plurality of polygons constituting a displayed polyhedron on a display screen, after conducting coordinate transformation for a plurality of vertexes on each of the polygons based on modeling data for geometrically defining the polyhedron, texture data for expressing a surface detail of each said polygon, and parameters including a view position and a view direction given by a virtual camera, comprising the steps of:

predetermining a plurality of view directions from said virtual camera for each said polygon;

presetting texture data for each said polygon for said plurality of predetermined view directions;

selecting the preset texture data for one of the predetermined view directions corresponding to an actual view direction for each said polygon being actually displayed; and mapping the preset texture data on each said polygon being actually displayed.

2. The texture mapping method according to claim 1, further comprising the steps of:

selecting the preset texture data for predetermined view directions closer to the actual view direction of each said polygon being actually displayed where there is no preset texture data corresponding to said actual view direction;

interpolating the selected preset texture data in accordance with an error between said actual view direction and the predetermined view directions closer to said actual view direction to obtain texture data of each said polygon being actually displayed; and mapping the texture data thus obtained on each said polygon being actually displayed.

3. A texture mapping apparatus for mapping texture data on each of a plurality of polygons constituting a displayed polyhedron on a display screen, after conducting coordinate transformation on a plurality of vertexes for each said polygon based on modeling data for geometrically defining said polyhedron, texture data for expressing a surface detail of each said polygon, and parameters including a view position and a view direction given by a virtual camera, comprising:

a memory for storing, for each said polygon, texture data for each of a plurality of predetermined view directions from said virtual camera;

a selection unit for selecting the stored texture data for one of the predetermined view directions corresponding to an actual view direction of each said polygon being actually displayed; and graphic image generation means for generating an image of said polyhedron by mapping said preset texture data on each said polygon being actually displayed.

4. The texture mapping apparatus according to claim 3, further comprising:

an interpolator for selecting the preset texture data for predetermined view directions closer to the actual view direction of each said polygon being actually displayed where there is no preset texture data corresponding to said actual view direction, the interpolator interpolating the selected preset texture data in accordance with an error between said actual view direction and the predetermined view directions closer to said actual view direction to obtain interpolated texture data for each said polygon being actually displayed;

wherein said graphic image generation means generates an image of said polyhedron by mapping the interpolated texture data thus obtained for each said polygon being actually displayed.

5. A texture mapping apparatus for mapping texture data on each of a plurality of polygons constituting a displayed polyhedron on a display screen, after conducting coordinate transformation on a plurality of vertexes of each said polygon based on modeling data for geometrically defining said polyhedron, texture data for expressing a surface detail of each said polygon, and parameters including a view position and a view direction given by a virtual camera, comprising:

a first memory for storing texture data for each of a plurality of predetermined view directions from said virtual camera for each said polygon;

a second memory for storing plural sets of mapping data, each set of mapping data including the texture data stored in the first memory, for the predetermined view directions, and an interpolation coefficient therebetween; and graphic image generating means for receiving a value corresponding to an actual view direction of each said polygon being actually displayed, the graphic image generating means reading a set of mapping data corresponding to said value from the second memory and conducting an interpolating process based on said set thus read to obtain interpolated texture data for each said polygon being actually displayed;

wherein said graphic image generation means generates an image of said polyhedron by mapping the interpolated texture data thus obtained on each said polygon being actually displayed.

6. A texture mapping method for mapping texture data on each of a plurality of polygons constituting a displayed polyhedron on a display screen, after conducting coordinate transformation on a plurality of vertexes of each said polygon based on modeling data for geometrically defining said polyhedron, texture data for expressing a surface detail of each said polygon, and parameters including a view position and a view direction given by a virtual camera, comprising the steps of:

predetermining a plurality of view directions from said virtual camera for each of the polygons;

pre-storing, in a texture memory, texture data for each of the polygons for said plurality of predetermined view directions;

determining, by a central processing unit (CPU), an actual view direction for each said polygon based on information inputted to said CPU, and sending a command indicating the actual view direction thus determined from said CPU to a graphic processor;

selecting, by said graphic processor, at least one pertinent texture data from the texture data pre-stored in said texture memory on a basis of the command received from said CPU; and mapping the texture data thus selected on each said polygon being actually displayed.

7. The texture mapping method according to claim 6, wherein the graphic processor includes a texture data management table for storing relationships between each of a plurality of displacement values representing a view direction of said virtual camera and one texture data corresponding thereto, and the texture mapping step includes:

supplying, by the graphic processor, one of the displacement values to the texture data management table;

reading, by the graphic processor, one texture data from the texture memory by using an output of the texture data management table; and mapping, by the graphic processor, the texture data thus read on each said polygon being actually displayed.

8. The texture mapping method according to claim 6, wherein the graphic processor includes a texture data management table for storing relationships between each of a plurality of displacement values representing a view direction of said virtual camera and a plurality of texture data corresponding thereto, and the texture mapping step includes:

supplying, by the graphic processor, one of the displacement values to the texture data management table;

reading, by the graphic processor, a plurality of texture data from the texture memory by using an output of the texture data management table;

interpolating, by the graphic processor, the plurality of texture data thus read to obtain new texture data; and mapping, by the graphic processor, the new texture data thus obtained on each said polygon being actually displayed.

9. The texture mapping method according to claim 6, wherein a texture data management table stores a relationship between each of a plurality of displacement values representing a view direction of said virtual camera, a plurality of texture data corresponding thereto and an interpolation coefficient between texture data corresponding thereto, the texture data management table being included in the graphic processor, and the texture mapping step includes:

supplying, by the graphic processor, one of the displacement values to said texture data management table;

reading, by the graphic processor, a plurality of texture data and the corresponding interpolation coefficient from said texture memory by using an output of said texture data management table;

interpolating, by the graphic processor, said plurality of texture data thus read to obtain new texture data by using the interpolation coefficient thus read; and mapping, by the graphic processor, the new texture data on each said polygon being actually displayed.

10. A texture mapping apparatus for mapping texture data on each of a plurality of polygons constituting a displayed polyhedron on a display screen, after conducting coordinate transformation on a plurality of vertexes of each of the polygons based on modeling data for geometrically defining said polyhedron, texture data for expressing a surface detail of each said polygon, and parameters including a view position and a view direction given by a virtual camera, comprising:

a texture memory for pre-storing texture data for each of a plurality of predetermined view directions from said virtual camera for each of the polygons;

a central processing unit (CPU) for determining a view direction of each polygon based on information inputted to said CPU, and sending a command indicating the view direction thus determined to a graphic processor; and said graphic processor for selecting at least one pertinent texture data from the texture data stored in said texture memory based on the command received from said CPU, and mapping the texture data thus selected on each said polygon being actually displayed.

11. The texture mapping apparatus according to claim 10, wherein:

said graphic processor includes a texture data management table for storing a relationship between each of a plurality of displacement values representing a view direction of said virtual camera and one texture data corresponding thereto; and said graphic processor supplies one of the displacement values to said texture data management table, reads one texture data from said texture memory by using an output of said texture data management table, and maps the texture data thus read on each said polygon being actually displayed.

12. The texture mapping apparatus according to claim 10, wherein:

said graphic processor includes a texture data management table for storing a relationship between each of a plurality of displacement values representing a view direction of said virtual camera and a plurality of texture data corresponding thereto; and said graphic processor supplies one of the displacement values to said texture data management table, reads a plurality of texture data from said texture memory by using an output of said texture data management table, interpolates said plurality of texture data thus read to obtain new texture data, and maps the new texture data thus obtained for each polygon being actually displayed.

13. The texture mapping apparatus according to claim 10, wherein:

said texture data management table stores a relationship between each of a plurality of displacement values representing a view direction of said virtual camera, a plurality of texture data corresponding thereto, and an interpolation coefficient between texture data corresponding thereto; and said graphic processor supplies a displacement value to said texture data management table, reads a plurality of texture data and a corresponding interpolation coefficient from said texture memory by using an output of said texture data management table, interpolates said plurality of texture data thus read to obtain new texture data by using the interpolation coefficient thus read, and maps the new texture data on each said polygon being actually displayed.

14. A driving simulator machine for displaying a simulated polyhedron constituted by a plurality of polygons, by mapping texture data on each of the polygons, after conducting coordinate transformation on vertexes of each said polygon based on modeling data for geometrically defining said polyhedron, texture data for expressing a surface detail of each of the polygons, and parameters including a view position and a view direction given by a virtual camera, comprising:

a display device having a display screen;

an input device for receiving input information representing at least steering wheel manipulation, brake manipulation and accelerator manipulation for simulation by an operator, and generating a signal representing said input information;

a central processing unit (CPU) responsive to said signals from said input device, for determining a view direction of each polygon based on information inputted to said CPU, and sending a command indicating the view direction thus determined;

a texture memory for pre-storing texture data for each of a plurality of predetermined view directions from said virtual camera for each said polygon; and a graphic processor connected to said CPU and responsive to said command from said CPU, for selecting at least one pertinent texture data from the texture data stored in said texture memory based on said command, and mapping the texture data thus selected on each said polygon being actually displayed.

* * * * *